US009483263B2

(12) United States Patent
Henry et al.

(10) Patent No.: US 9,483,263 B2
(45) Date of Patent: Nov. 1, 2016

(54) UNCORE MICROCODE ROM (71) Applicant: VIA Technologies, Inc., New Taipei (TW)

(72) Inventors: G. Glenn Henry, Austin, TX (US); Terry Parks, Austin, TX (US); Rodney E. Hooker, Austin, TX (US); John D. Bunda, Austin, TX (US); Brent Bean, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 431 days.

(21) Appl. No.: 14/072,428

(22) Filed: Nov. 5, 2013

(65) Prior Publication Data
US 2014/0297993 A1  Oct. 2, 2014

Related U.S. Application Data (60) Provisional application No. 61/805,220, filed on Mar. 26, 2013.

(51) Int. Cl.
*G06F 9/00* (2006.01)
*G06F 9/44* (2006.01)
*G06F 9/26* (2006.01)
*G06F 9/30* (2006.01)

(52) U.S. Cl.
CPC ............. *G06F 9/26* (2013.01); *G06F 9/30145* (2013.01); *G06F 9/30174* (2013.01)

(58) Field of Classification Search
None
See application file for complete search history.

(56) References Cited

U.S. PATENT DOCUMENTS

| 8,060,727 B2* | 11/2011 | Blixt | G06F 9/3867 712/205 |
| 2002/0046324 A1* | 4/2002 | Barroso | G06F 12/0826 711/122 |
| 2004/0148472 A1* | 7/2004 | Barroso | G06F 12/0817 711/141 |
| 2012/0030509 A1* | 2/2012 | Wood | G06F 11/2236 714/6.31 |

(Continued)

OTHER PUBLICATIONS

"Scratchpad Memory" Wikipedia Downloaded Mar. 12, 2013 from http://en.wikipedia.org/wiki/scratchpad_memory pp. 1-3.
"Cyrix 6x86" Wikipedia Downloaded Mar. 12, 2013 from http://en.wikipedia.org/wiki/Cyrix_6x86 pp. 1-4.

(Continued)

*Primary Examiner* — Michael Sun
(74) *Attorney, Agent, or Firm* — E. Alan Davis; Eric W. Cernyar; James W. Huffman (57) ABSTRACT

A microprocessor includes a plurality of processing cores each comprises a corresponding memory physically located inside the core and readable by the core but not readable by the other cores ("core memory"). The microprocessor also includes a memory physically located outside all of the cores and readable by all of the cores ("uncore memory"). For each core, the uncore memory and corresponding core memory collectively provide M words of storage for microcode instructions fetchable by the core as follows: the uncore memory provides J of the M words of microcode instruction storage, and the corresponding core memory provides K of the M words of microcode instruction storage. J, K and M are counting numbers, and M=J+K. The memories are non-architecturally-visible and accessed using a fetch address provided by a non-architectural program counter, and the microcode instructions are non-architectural instructions that implement architectural instructions.

20 Claims, 5 Drawing Sheets

(56) References Cited

U.S. PATENT DOCUMENTS

| | | | | |
|---|---|---|---|---|
| 2013/0275727 A1* | 10/2013 | Abraham | ............ | G06F 9/3001 712/221 |
| 2013/0290685 A1* | 10/2013 | Corbal San Adrian | ............ | G06F 9/3001 712/222 |
| 2013/0297917 A1* | 11/2013 | Nguyen | ............ | G06F 11/3636 712/227 |
| 2013/0339616 A1* | 12/2013 | Alexander | ............ | G06F 12/084 711/130 |
| 2014/0006714 A1* | 1/2014 | Cherukuri | ............ | G06F 12/0817 711/128 |
| 2014/0089635 A1* | 3/2014 | Shifer | ............ | G06F 9/30076 712/30 |
| 2014/0189256 A1* | 7/2014 | Kranich | ............ | G06F 9/526 711/147 |
| 2014/0189314 A1* | 7/2014 | Kurts | ............ | G06F 9/30145 712/216 |
| 2015/0186077 A1* | 7/2015 | Lee | ............ | G06F 3/0604 711/103 |

OTHER PUBLICATIONS

"80C52 Family Programmer's Guide and Instruction Set" Philips Semiconductors. Sep. 18, 1997, p. 78-79 and 90-93. Downloaded Mar. 12, 2013 from http://www.keil.com/dd/docs/datashts/philips/p51_pg.pdf.

"CUDA C Best Practices Guide" DC-05603-001_v5.0 Oct. 2012 Downloaded Mar. 12, 2013 from http://docs.nvidia.com/cuda/pdf/CUDA_C_Best_Practices_Guide.pdf. Cover Page and pp. 23-38.

"NVIDIA's Next Generation CUDA™ Compute Architecture; FERMI™" Whitepaper V1.1. Downloaded Mar. 12, 2013 from http://www.nvidia.com/content/PDF/fermi_white_papers/NVIDIA_Fermi_Compute_Architecture_Whitepaper.pdf. pp. 1-22.

"CUDA" Wikipedia Downloaded Mar. 12, 2013 from http://en.wikipedia.org/wiki/CUDA pp. 1-13.

"PGI CUDA-X86" The Portland Group. Downloaded Mar. 12, 2013 from http://pgroup.com/resources/cuda-x86.htm pp. 1-3

* cited by examiner

MICROCODE ADDRESS SPACE

FIG. 6

UNCORE MICROCODE ROM

CROSS REFERENCE TO RELATED APPLICATION(S)

This application claims priority based on U.S. Provisional Application Ser. No. 61/805,220, filed Mar. 26, 2013, entitled UNCORE MICROCODE ROM, which is hereby incorporated by reference in its entirety.

BACKGROUND

Die space on integrated circuits is precious. This is primarily for two reasons. First, the larger the die the lower the yield rate and the higher the cost. Second, because the realistic maximum die size is bounded by an economically acceptable yield rate, the amount of functionality—which largely translates into performance—is limited by the amount of circuitry that can be placed on the die. This is particularly true for highly complex integrated circuits such as microprocessors.

The trend in microprocessor design is toward multi-core microprocessors. That is, each microprocessor includes multiple processing cores on a single integrated circuit. Typically, the multiple processing cores are essentially identical designs replicated on the die, although the multiple cores may share resources that are not within any of the cores. A common example of such a shared resource is a level-2 cache memory. The replication of a processing core multiple times on an integrated circuit creates the need for each core to be as small as possible, since each circuit in the processing core design will typically be replicated multiple times, not uncommonly four or more.

BRIEF SUMMARY

In one aspect the present invention provides a microprocessor. The microprocessor includes a plurality of processing cores. Each core of the plurality of processing cores comprises a corresponding memory physically located inside the core and readable by the core but not readable by the other of the plurality of processing cores ("core memory"). The microprocessor also includes a memory physically located outside all of the plurality of processing cores and readable by all of the plurality of processing cores ("uncore memory"). For each core of the cores, the uncore memory and corresponding core memory collectively provide M words of storage for microcode instructions fetchable by the core as follows: the uncore memory provides J of the M words of microcode instruction storage, and the corresponding core memory provides K of the M words of microcode instruction storage. J, K and M are counting numbers, and M=J+K.

In another aspect, the present invention provides a method for providing microcode instruction storage space for a plurality of processing cores of a microprocessor. The method includes, for each core of the cores, providing M words of memory storage for microcode instructions fetchable by the core. Providing the M words of memory storage comprises: for each core of the cores, providing J of the M words of microcode instruction storage from a memory physically located outside all of the plurality of processing cores and readable by all of the plurality of processing cores ("uncore memory"), and for each core of the cores, providing K of the M words of microcode instruction storage from a corresponding memory physically located inside the core and readable only by the core ("core memory"). J, K and M are counting numbers, and M=J+K.

In yet another aspect, the present invention provides an integrated circuit. The integrated circuit includes a plurality of processing cores, wherein each core of the plurality of cores comprises its own unshared memory physically located inside the core and configured to store a first portion of microcode instructions. The integrated circuit also includes a shared memory, physically located outside the plurality of processing cores and configured to store a second portion of microcode instructions. Each of the processing cores is configured to fetch both the first portion of microcode instructions from its own unshared memory and the second portion of microcode instructions from the shared memory.

In yet another aspect, the present invention provides a computer program product encoded in at least one non-transitory computer usable medium for use with a computing device, the computer program product comprising computer usable program code embodied in the medium for specifying a microprocessor. The computer usable program code includes first program code for specifying a plurality of processing cores, wherein each core of the plurality of processing cores comprises a corresponding memory physically located inside the core and readable by the core but not readable by the other of the plurality of processing cores (hereinafter "core memory"). The computer usable program code also includes second program code for specifying a memory physically located outside all of the plurality of processing cores and readable by all of the plurality of processing cores (hereinafter "uncore memory"). For each core of the cores, the uncore memory and corresponding core memory collectively provide M words of storage for microcode instructions fetchable by the core as follows: the uncore memory provides J of the M words of microcode instruction storage, and the corresponding core memory provides K of the M words of microcode instruction storage. J, K and M are counting numbers, and M=J+K.

DETAILED DESCRIPTION OF THE EMBODIMENTS

Microcode instructions are non-architectural instructions stored within one or more memories of a microprocessor that are fetched by one or more processing cores of the microprocessor based on a memory address stored in a non-architectural program counter and used by the cores to implement instructions of the instruction set architecture of the microprocessor.

A word is a plurality of bits.

An instruction translator comprises an arrangement of transistors that receives an instruction set architecture (ISA) machine language instruction as input and responsively outputs one or more microinstructions for execution by execution units of the microprocessor. The results of the execution of the one or more microinstructions are the results defined by the ISA instruction. Thus, the collective execution of the one or more microinstructions by the execution units "implements" the ISA instruction; that is, the collective execution by the execution units of the implementing microinstructions output by the instruction translator performs the operation specified by the ISA instruction on inputs specified by the ISA instruction to produce a result defined by the ISA instruction. Thus, the instruction translator is said to "translate" the ISA instruction into the one or more implementing microinstructions.

A microinstruction set is the set of instructions (microinstructions) the execution units of the microprocessor can execute.

An instruction set defines the mapping of a set of binary encoded values, which are machine language instructions, to operations the microprocessor performs. Illustrative examples of the types of operations machine language instructions may instruct a microprocessor to perform are: add the operand in register 1 to the operand in register 2 and write the result to register 3, subtract the immediate operand specified in the instruction from the operand in memory location 0x12345678 and write the result to register 5, shift the value in register 6 by the number of bits specified in register 7, branch to the instruction 36 bytes after this instruction if the zero flag is set, load the value from memory location 0xABCD0000 into register 8. Thus, the instruction set defines the binary encoded value each machine language instruction must have to cause the microprocessor to perform the desired operation. It should be understood that the fact that the instruction set defines the mapping of binary values to microprocessor operations does not imply that a single binary value maps to a single microprocessor operation. More specifically, in some instruction sets, multiple binary values may map to the same microprocessor operation.

An instruction set architecture (ISA), in the context of a family of microprocessors, comprises: (1) an instruction set, (2) a set of resources (e.g., registers and modes for addressing memory) accessible by the instructions of the instruction set, and (3) a set of exceptions the microprocessor generates in response to processing the instructions of the instruction set (e.g., divide by zero, page fault, memory protection violation). Because a programmer, such as an assembler or compiler writer, who wants to generate a machine language program to run on a microprocessor family requires a definition of its ISA, the manufacturer of the microprocessor family typically defines the ISA in a programmer's manual. For example, at the time of its publication, the Intel 64 and IA-32 Architectures Software Developer's Manual, March 2009 (consisting of five volumes, namely Volume 1: Basic Architecture; Volume 2A: Instruction Set Reference, A-M; Volume 2B: Instruction Set Reference, N-Z; Volume 3A: System Programming Guide; and Volume 3B: System Programming Guide, Part 2), which is hereby incorporated by reference herein in its entirety for all purposes, defined the ISA of the Intel 64 and IA-32 processor architecture, which is commonly referred to as the x86 architecture and which is also referred to herein as x86, x86 ISA, x86 ISA family, x86 family or similar terms. For another example, at the time of its publication, the ARM Architecture Reference Manual, ARM v7-A and ARM v7-R edition Errata markup, 2010, which is hereby incorporated by reference herein in its entirety for all purposes, defined the ISA of the ARM processor architecture, which is also referred to herein as ARM, ARM ISA, ARM ISA family, ARM family or similar terms. Other examples of well-known ISA families are IBM System/360/370/390 and z/Architecture, DEC VAX, Motorola 68 k, MIPS, SPARC, PowerPC, and DEC Alpha. The ISA definition covers a family of processors because over the life of the ISA processor family the manufacturer may enhance the ISA of the original processor in the family by, for example, adding new instructions to the instruction set and/or new registers to the architectural register set. To clarify by example, as the x86 ISA evolved it introduced in the Intel Pentium III processor family a set of 128-bit XMM registers as part of the SSE extensions, and x86 ISA machine language programs have been developed to utilize the XMM registers to increase performance, although x86 ISA machine language programs exist that do not utilize the XMM registers of the SSE extensions. Furthermore, other manufacturers have designed and manufactured microprocessors that run x86 ISA machine language programs. For example, Advanced Micro Devices (AMD) and VIA Technologies have added new features, such as the AMD 3DNOW! SIMD vector processing instructions and the VIA Padlock Security Engine random number generator and advanced cryptography engine features, each of which are utilized by some x86 ISA machine language programs but which are not implemented in current Intel microprocessors. To clarify by another example, the ARM ISA originally defined the ARM instruction set state, having 4-byte instructions. However, the ARM ISA evolved to add, for example, the Thumb instruction set state with 2-byte instructions to increase code density and the Jazelle instruction set state to accelerate Java bytecode programs, and ARM ISA machine language programs have been developed to utilize some or all of the other ARM ISA instruction set states, although ARM ISA machine language programs exist that do not utilize the other ARM ISA instruction set states.

Figure 1:
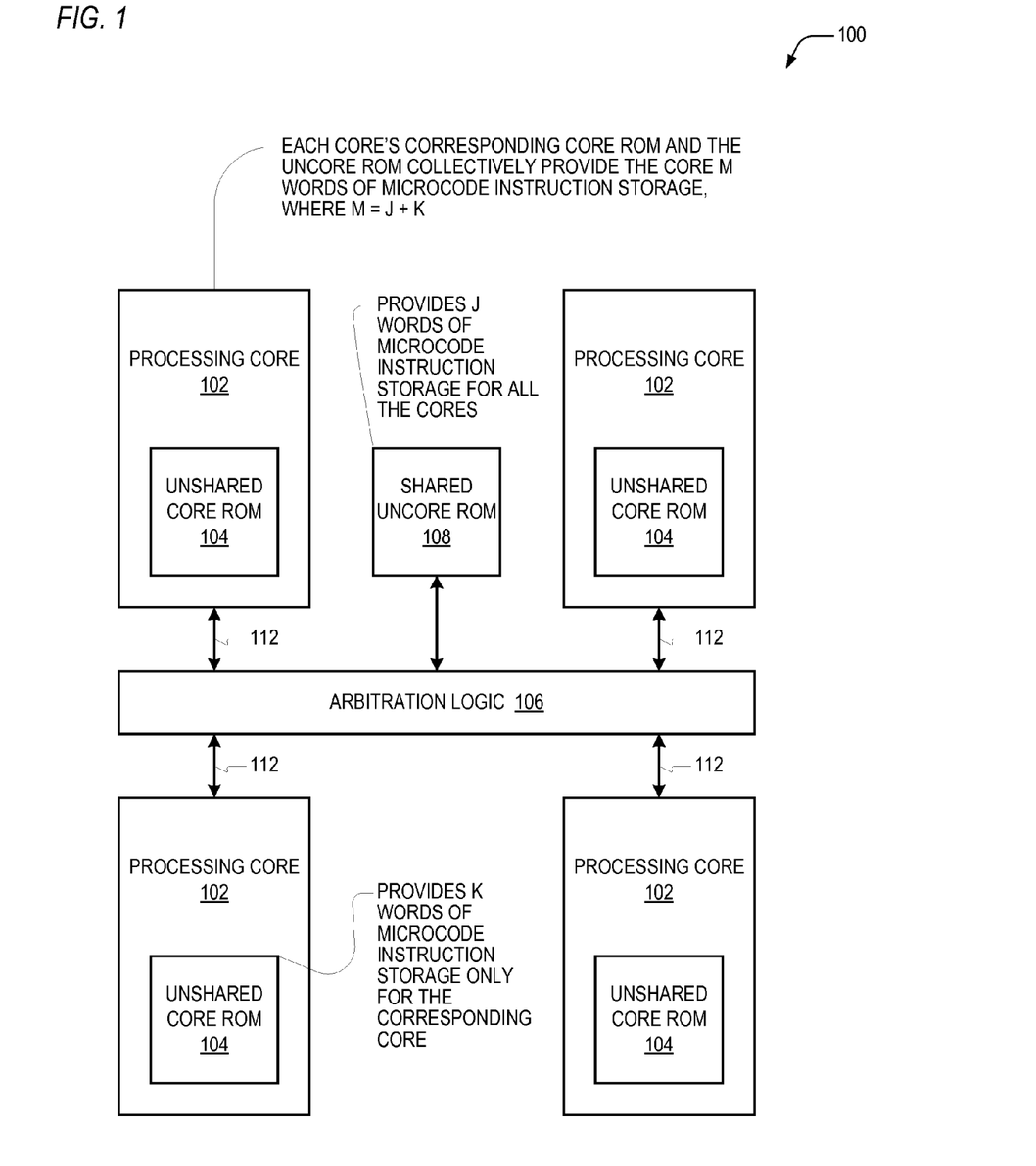
FIG. 1 is a block diagram illustrating comprising a multi-core microprocessor.

Referring now to FIG. 1, a block diagram illustrating a multi-core microprocessor 100 is shown. Preferably, the microprocessor 100 physically resides on a single integrated circuit. The microprocessor 100 includes a plurality of processing cores 102, an uncore read-only memory (ROM) 108 shared by the plurality of cores 102, and arbitration logic 106 (also referred to as control logic) that couples the cores 102 to the uncore ROM 108. Each of the cores 102 includes a corresponding core ROM 104 that is not shared by the other cores 102, but is instead private, or local, to the core 102. Each of the cores 102 is coupled to the arbitration logic 106 by a corresponding bus 112.

The microprocessor 100 includes a portion referred to as the "uncore." The uncore is the portion of the microprocessor 100 that is not part of any of the processing cores 102. The uncore ROM 108 resides in the uncore of the microprocessor 100. Preferably, the cores 102 are a single design that is replicated multiple times. In the embodiment of FIG. 1, four cores 102 are shown, although other embodiments are contemplated with different numbers of cores 102. The arbitration logic 106 also resides in the uncore portion of the microprocessor 100. The arbitration logic 106 arbitrates among the cores 102 as they request access to the uncore ROM 108.

Figure 3:
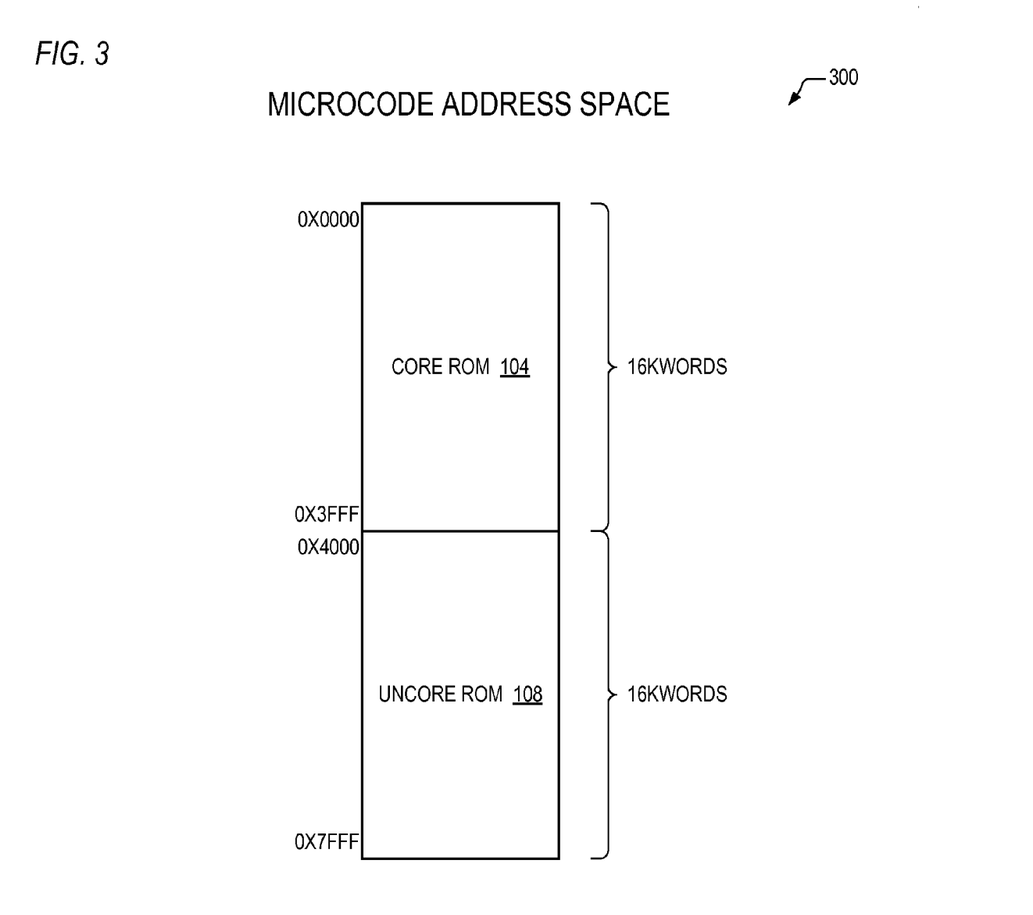
FIG. 3 is a block diagram illustrating an example of the microcode address space of each core of FIG. 1.

The uncore ROM 108 provides some number of words—referred to in FIG. 1 as "J"—of storage for microcode instructions that are fetchable by all of the cores 102. Each of the core ROMs 104 provides some number of words—referred to in FIG. 1 as "K"—of storage for microcode instructions that are fetchable only by the corresponding core 102. The J words of the uncore ROM 108 and the K words of the corresponding core ROM 104 reside at different address locations of the microcode memory address space of the core 102, as described in more detail below. Thus, collectively, for each core 102, its corresponding core ROM 104 and the uncore ROM 108 provide J+K words of storage for microcode instructions that are fetchable by the core 102. An example is shown in FIG. 3, which is described in more detail below.

In one embodiment, the uncore ROM 108 has J addressable memory locations each being the width of a microcode instruction. In one embodiment, each core ROM 108 has K addressable memory locations each being the width of a microcode instruction. In one embodiment, the width of a microcode instruction is 38 bits. In an alternate embodiment, the microcode instructions within the uncore ROM 108 and core ROMs 104 are compressed according to a compression algorithm tailored to the particular encoding of the microcode instructions within the microcode instruction set. In such an embodiment, the instruction translator 294 (of FIG. 2) includes decompression logic (not shown) that decompresses the compressed microcode instruction words. In one embodiment, the compressed microcode instruction words are 28 bits.

In one embodiment, the uncore ROM 108 includes a single read port that is shared by all of the cores 102, and the arbitration logic 106 serves to grant use of the read port by the cores 102 according to an arbitration algorithm. In one embodiment, if only one core 102 is requesting access to the uncore ROM 108 in a given request cycle, then the arbitration logic 106 grants the single requesting core 102; whereas, if multiple cores 102 are requesting access to the uncore ROM 108 in a given request cycle, then the arbitration logic 106 grants access in round-robin order. However, other arbitration algorithms are contemplated. Other embodiments are contemplated in which the uncore ROM 108 includes a plurality of read ports that are shared by the cores 102. Other embodiments are contemplated in which the uncore ROM 108 includes a read port for each of the cores 102. However, it is noted that the more read ports included in the uncore ROM 108 the larger it will be such that the benefit in terms of die area may be reduced.

An advantage of the presence of the uncore ROM 108 is that it potentially provides a reduction in the size of the integrated circuit 100 in exchange for an increase in latency when accessing microcode instructions from the uncore ROM 108. The latency increase may be attributed to the greater distance of the uncore ROM 108 from the microcode unit of each of the cores 102. That is, propagation delays may be increased due to the extra distance, thereby requiring additional pipeline staging and associated additional clock cycles. Additionally, the latency increase may be attributed to the fact that the uncore ROM 108 is a shared resource that must be arbitrated for among the multiple cores 102 requesting access to it. Furthermore, the shared nature of the uncore ROM 108 may result in a variable access latency, unlike the core ROM 104 that may have a fixed latency. However, the increased/variable latency may be a desirable tradeoff for the reduced die size in some instances.

Figure 2:
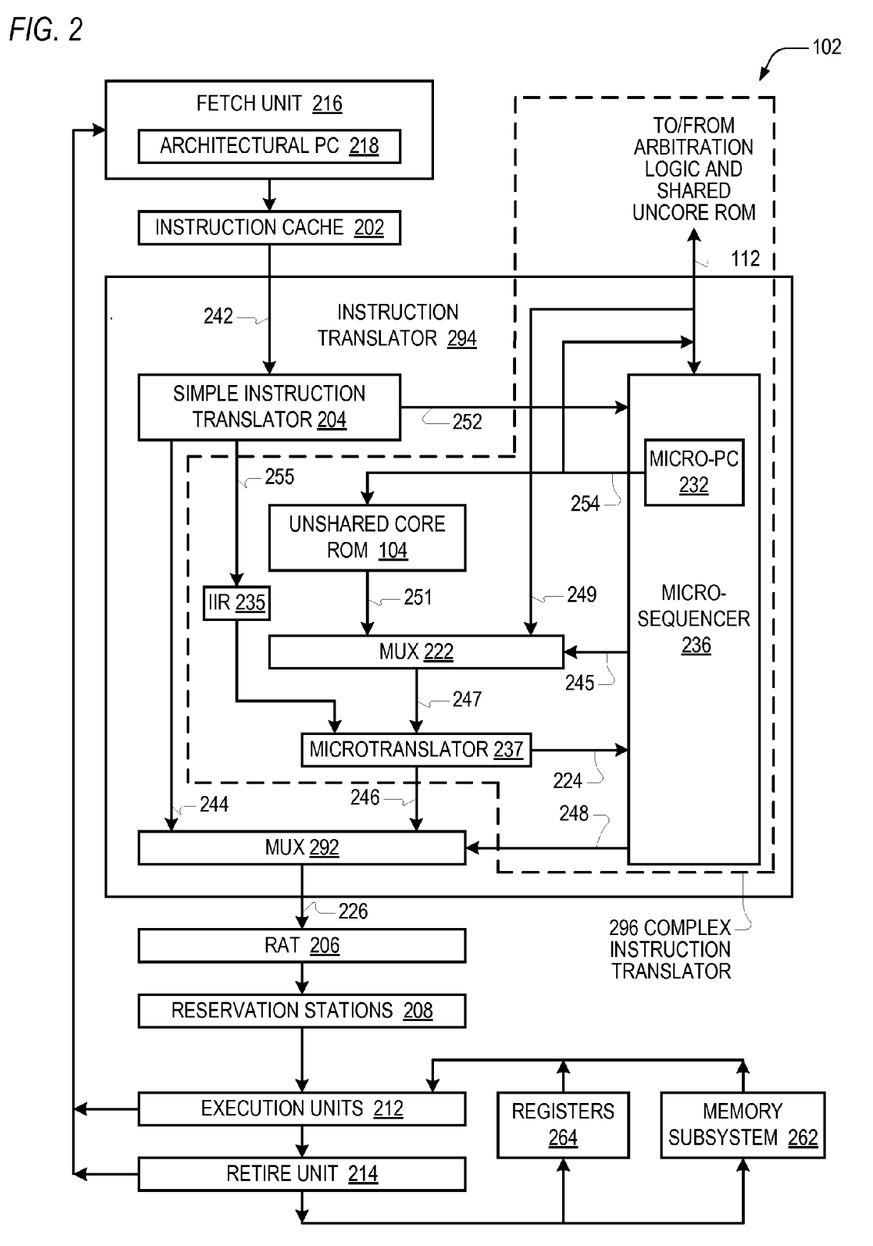
FIG. 2 is a block diagram illustrating in more detail a processing core of FIG. 1.

Referring now to FIG. 2, a block diagram illustrating in more detail a processing core 102 of FIG. 1 is shown. The core 102 includes a pipeline of stages that includes various functional units. Preferably, the core 102 is a superscalar, out-of-order execution, pipelined data processing core. The core 102 includes an instruction fetch unit 216, coupled to an instruction cache 202, coupled to an instruction translator 294, coupled to a register alias table (RAT) 206, coupled to reservation stations 208, coupled to execution units 212, coupled to a retire unit 214. The execution units 212 receive operands from registers 264 (both architectural and non-architectural) and from a memory subsystem 262. The retire unit 214 retires microinstruction results to the registers 264 and memory subsystem 262. The instruction translator 294 is coupled to the arbitration logic 106 via the bus 112 of FIG. 1. The fetch unit 216 includes the architectural program counter (PC) 218 of the core 102. The retire unit 214 updates the architectural PC 218 as it retires instructions. The fetch unit 216 provides an architectural instruction fetch address to the instruction cache 102. The fetch unit 216 generates the architectural fetch address based on the architectural PC 218. Additionally, the execution units 212 may execute branch instructions and provide branch target addresses to the fetch unit 216, which it uses to generate the architectural fetch address. Finally, branch predictors (not shown) of the fetch unit 216 may provide predicted branch target addresses used to generate the architectural fetch address. As described below in more detail, the architectural PC 218 is distinct from a non-architectural microcode program counter (micro-PC) 224 maintained by the instruction translator 294, and the architectural fetch address generated by the fetch unit 216 to the instruction cache 202 is distinct from a non-architectural microcode fetch address 254 generated by a microsequencer 236 (also referred to as control logic) of the instruction translator 294, all of which are described below.

The instruction cache 202 caches architectural instructions 242, also referred to as macroinstructions 242 or ISA instructions 242, which are instructions defined by the instruction set architecture of the microprocessor 100 (e.g., the x86, ARM, SPARC, etc. architectures). The instruction translator 294 translates the macroinstructions 242 into microinstructions 226 of the microinstruction set of a microarchitecture of the core 102, which preferably has characteristics typically associated with RISC architectures. The instruction translator 294 is described in more detail below.

The instruction translator 294 provides the microinstructions to the RAT 206 in program order. The RAT 206 allocates entries for the microinstructions in a reorder buffer of the retire unit 214 in program order. The RAT 206 performs register 264 renaming. The RAT 206 provides the microinstructions to the reservation stations 208 from which the microinstructions are issued to the execution units 212 for execution out of program order as the source operands of each microinstruction become available and an execution unit 212 is available to execute the microinstruction. The retire unit 214 retires instructions in program order by writing the results of the microinstructions executed by the execution units 212 to architectural state of the core 102. The execution units 212 may include a load/store unit, integer units, floating-point units, branch units, SIMD units and the like. The load unit reads data from a level-1 (L1) data cache and the store unit writes data to the L1 data cache. A level-2 (L2) cache may back the L1 data cache and the instruction cache 202.

The instruction translator 294 receives blocks of macroinstructions 242 from the instruction cache 102 of FIG. 1. The macroinstructions 242 are also referred to as architectural instructions 242 or ISA instructions 242. The instruction translator 294 translates the ISA instructions 242 into implementing microinstructions 226 that are provided to the RAT 206. The instruction translator 294 includes a simple instruction translator (SIT) 204 that outputs implementing microinstructions 244 and a microcode address 252; a complex instruction translator (CIT) 296 (also referred to as a microcode unit 296) that receives the microcode address 252 and provides implementing microinstructions 246; and a mux 292 that receives microinstructions 244 from the simple instruction translator 204 on one input and that receives the microinstructions 246 from the complex instruction translator 296 on the other input and that provides the implementing microinstructions 226 to the execution pipeline 112 of FIG. 1 based on a select control input 248.

The complex instruction translator 296 includes the microsequencer 236 that receives the microcode address 252 and that maintains a micro-program counter (micro-PC) 232; the core ROM 104 of FIG. 1 that receives a microcode fetch address 254 that is based on the micro-PC 232; the uncore ROM 108 of FIG. 1 that receives the microcode fetch address 254 via bus 112; an instruction indirection register (IIR) 235; a mux 222 that receives microcode instructions 251 from the unshared core ROM 104 on a first input and receives microcode instructions 249 (via bus 112) from the shared uncore ROM 108 on a second input and outputs microcode instructions 247 based on a select control input 245 generated by the microsequencer 236; and a microtranslator 237 that translates the microcode instructions 247 received from the mux 222 to generate the implementing microinstructions 246 output by the complex instruction translator 296. Both the implementing microinstructions 244 generated by the simple instruction translator 204 and the implementing microinstructions 246 generated by the complex instruction translator 296 are microinstructions 226 of the microinstruction set of the microarchitecture of the microprocessor 100 and which are executable by the execution pipeline 112.

The mux 292 is controlled by the select input 248. Normally, the mux 292 selects the microinstructions 244 from the simple instruction translator 204; however, when the simple instruction translator 204 encounters a complex ISA instruction 242 and transfers control, or traps, to the complex instruction translator 296, the simple instruction translator 204 controls the select input 248 to cause the mux 292 to select microinstructions 246 from the complex instruction translator 296. When the RAT 206 encounters a microinstruction 226 with a special bit set to indicate it is the last microinstruction 226 in the sequence implementing the complex ISA instruction 242, the RAT 206 controls the select input 248 to cause the mux 292 to return to selecting microinstructions 244 from the simple instruction translator 204. Additionally, the retire unit 214 controls the select input 248 to cause the mux 292 to select microinstructions 246 from the complex instruction translator 296 when the retire unit 214 is ready to retire a microinstruction 226 whose status requires such, for example if the status indicates the microinstruction 226 has caused an exception condition.

The simple instruction translator 204 receives the ISA instructions 242 and decodes them to determine whether the ISA instructions 242 are simple or complex ISA instructions. A simple ISA instruction 242 is one for which the simple instruction translator 204 can emit all the implementing microinstructions 226 that implement the ISA instruction 242; that is, the complex instruction translator 296 does not provide any of the implementing microinstructions 226 for a simple ISA instruction 242. In contrast, a complex ISA instruction 242 requires the complex instruction translator 296 to provide at least some, if not all, of the implementing microinstructions 226. In one embodiment, for a subset of the ISA instructions 242, the simple instruction translator 204 emits a portion of the microinstructions 244 that implement the ISA instruction 242 and then transfers control to the complex instruction translator 296, which subsequently emits the remainder of the microinstructions 246 that implement the ISA instruction 242. The mux 292 is controlled to first provide the implementing microinstructions 244 from the simple instruction translator 204 as microinstructions 226 to the execution pipeline 112 and second to provide the implementing microinstructions 246 from the complex instruction translator 296 as microinstructions 226 to the execution pipeline 112. The simple instruction translator 204 knows the starting microcode address of the various microcode routines employed by the instruction translator 294 to generate the implementing microinstructions 226 for various complex ISA instructions 242, and when the simple instruction translator 204 decodes a complex ISA instruction 242, it provides the relevant microcode routine address 252 to the micro-PC 232 of the complex instruction translator 296. The simple instruction translator 204 emits all the microinstructions 244 needed to implement a relatively large percentage of the ISA instructions 242, particularly ISA instructions 242 that tend to be performed by ISA machine language programs with a high frequency, and only a relatively small percentage requires the complex instruction translator 296 to provide implementing microinstructions 246. In one embodiment, the simple instruction translator 204 is a block of Boolean logic gates synthesized using well-known synthesis tools.

The complex instruction translator 296 outputs a sequence of implementing microinstructions 246 to the mux 292. The microcode ROMs 104/108 store microcode instructions 251/249 of microcode routines. The microcode ROMs 104/108 output the microcode instructions 251/249 in response to the microcode fetch address 254, which is held by the micro-PC 232. Typically, the micro-PC 232 receives its initial value 252 from the simple instruction translator 204 in response to the simple instruction translator 204 decoding a complex ISA instruction 242. In other cases, such as in response to a reset or exception, the micro-PC 232 receives the address of the reset microcode routine address or appropriate microcode exception handler address, respectively. Normally, the microsequencer 236 increments the micro-PC 232 by the size of a microcode instruction 247 (which is one (1) in embodiments in which the size of a microcode instruction is the size of a word in the ROMs 104/108) to sequence through microcode routines. Alternatively, the microsequencer 236 updates the micro-PC 236 to a target address 224 generated by the microtranslator 237 in response to decoding a control type microcode instruction 247, such as a branch instruction, or to a target address generated by the execution pipeline 112 in response to execution of a control type microinstruction 226, to effect a branch to non-sequential locations in the microcode ROMs 104/108. The microcode ROMs 104/108 are manufactured within the semiconductor die of the microprocessor 100.

In addition to the microinstructions 244 that implement a simple ISA instruction 242 or a portion of a complex ISA instruction 242, the simple instruction translator 204 also generates ISA instruction information 255 that is written to the instruction indirection register (IIR) 235. The ISA instruction information 255 stored in the IIR 235 includes information about the ISA instruction 242 being translated, for example, information identifying the source and destination registers specified by the ISA instruction 242 and the form of the ISA instruction 242, such as whether the ISA instruction 242 operates on an operand in memory or in an architectural register 264 of the microprocessor 100. This enables the microcode routines to be generic, i.e., without having to have a different microcode routine for each different source and/or destination architectural register 264. In particular, the simple instruction translator 204 is knowledgeable of the register file 264 and translates the register information provided in the ISA instruction 242 to the appropriate register in the register file 264 via the ISA instruction information 255. The ISA instruction information 255 also includes a displacement field, an immediate field, a constant field, rename information for each source operand as well as for the microinstruction 226 itself, information to indicate the first and last microinstruction 226 in the sequence of microinstructions 226 that implement the ISA instruction 242, and other bits of useful information gleaned from the decode of the ISA instruction 242 by the simple instruction translator 204.

The microtranslator 237 receives the microcode instructions 247 from the mux 222 and the contents of the IIR 235. In response, the microtranslator 237 generates implementing microinstructions 246. The microtranslator 237 translates certain microcode instructions 247 into different sequences of microinstructions 246 depending upon the information received from the IIR 235, such as depending upon the form of the ISA instruction 242 and the source and/or destination architectural register 264 combinations specified by them. In some cases, much of the ISA instruction information 255 is merged with the microcode instruction 247 to generate the implementing microinstructions 246. In one embodiment, each microcode instruction 247 is approximately 40 bits wide and each microinstruction 246 is approximately 200 bits wide. In one embodiment, the microtranslator 237 is capable of generating up to three microinstructions 246 from a microcode instruction 247. The microtranslator 237 comprises Boolean logic gates that generate the implementing microinstructions 246.

An advantage provided by the microtranslator 237 is that the size of the microcode ROMs 104/108 may be reduced since they do not need to store the ISA instruction information 255 provided by the IIR 235 since the simple instruction translator 204 generates the ISA instruction information 255. Furthermore, the microcode routines may include fewer conditional branch instructions because they do not need to include a separate routine for each different ISA instruction form and for each source and/or destination architectural register 264 combination. For example, if the complex ISA instruction 242 is a memory form, the simple instruction translator 204 may generate a prolog of microinstructions 244 that includes microinstructions 244 to load the source operand from memory into a temporary register 264, and the microtranslator 237 may generate a microinstruction 246 to store the result from the temporary register to memory; whereas, if the complex ISA instruction 242 is a register form, the prolog may move the source operand from the source register specified by the ISA instruction 242 to the temporary register 264, and the microtranslator 237 may generate a microinstruction 246 to move the result from a temporary register to the architectural destination register 264 specified by the IIR 235. In one embodiment, the microtranslator 237 is similar in many respects to the microtranslator 237 described in U.S. patent application Ser. No. 12/766,244, filed on Apr. 23, 2010, which claims priority to U.S. Provisional Application No. 61/234,008, filed Aug. 14, 2009, and which published as U.S. Patent Publication No. 2011/0040953 on Feb. 17, 2011, each of which is hereby incorporated by reference herein in its entirety for all purposes.

In the alternate embodiment of FIG. 6 described below, the instruction translator 294 does not include a microtranslator 237 and the microcode instructions 251/249 fetched from the microcode ROMs 104/108 are microinstructions that are executable by the execution units 212.

It is noted that the micro-PC 232 is distinct from the architectural PC 218; that is, the micro-PC 232 does not hold the address of ISA instructions 242, and the addresses held in the micro-PC 232 are not within the system memory address space.

As stated above, the microcode instructions 247 are non-architectural instructions stored within one or more memories 104/108 of the microprocessor 100 that are fetched by the processing core 102 based on the fetch address 254 stored in the non-architectural micro-PC 232 and used by the core 102 to implement the instructions 242 of the instruction set architecture of the microprocessor 100. The microcode instructions 247 are translated by the microtranslator 237 into the microinstructions 246 that are executed by the execution units 212, or in an alternate embodiment the microcode instructions 247 are executed directly by the execution units 212 (in which case they are microinstructions 246). That the microcode instructions 247 are non-architectural instructions means they are not instructions of the instruction set architecture (ISA) of the microprocessor 100 but are instead encoded according to an instruction set distinct from the architectural instruction set. The non-architectural micro-PC 232 is not defined by the instruction set architecture of the microprocessor 100 and is distinct from the architecturally-defined program counter 218. The microcode is used to implement some or all of the instructions of the instruction set of the microprocessor's ISA as follows. In response to decoding a microcode-implemented ISA instruction 242, the microprocessor 100, more specifically the simple instruction translator 294, transfers control to a microcode routine associated with the ISA instruction 242. The microcode routine comprises microcode instructions. The execution units 212 execute the microcode instructions 247, or, according to the embodiment of FIG. 2, the microcode instructions 247 are further translated into microinstructions 246 that are executed by the execution units 212. The results of the execution of the microcode instructions 247 (or microinstructions 246 from which the microcode instructions 247 are translated) by the execution units 212 are the results defined by the ISA instruction 242. Thus, the collective execution of the microcode routine associated with the ISA instruction 242 (or of the microinstructions 246 translated from the microcode routine instructions) by the execution units 212 "implements" the ISA instruction 242; that is, the collective execution by the execution units 212 of the implementing microcode instructions 247 (or of the microinstructions 246 translated from the microcode instructions 247) performs the operation specified by the ISA instruction 242 on inputs specified by the ISA instruction 242 to produce a result defined by the ISA instruction 242. Additionally, the microcode instructions may be executed (or translated into microinstructions that are executed) when the microprocessor is reset in order to configure the microprocessor.

In one embodiment, the arbitration logic 106 of FIG. 1 includes a request queue (not shown) that holds requests received from each of the cores 102 to access the uncore ROM 108. In one embodiment, each bus 112 between the arbitration logic 106 and a core 102 includes a request portion and a response portion. On the request portion, the core 102 specifies the fetch address 254 of the microcode instruction word it is requesting. On the response portion, the arbitration logic 106 provides a microcode instruction word, an address, a core number, and a valid indicator. The microcode instruction word, address and core number are only valid if the valid indicator so indicates. The core number specifies the core 102 for which the arbitration logic 106 is providing a response to a previous request to access the uncore ROM 108. The address specifies the address from which the microcode instruction word was fetched from the uncore ROM 108. In one embodiment, the arbitration logic 106 may assert a stall signal on bus 112 to a core 102 to indicate that the arbitration logic 106 cannot receive any more requests from the core 102 to access the uncore ROM 108. The arbitration logic 106 deasserts the stalls signal once it is able to receive requests again. In one embodiment, if the RAT 206 asserts a stall signal to the instruction translator 294 to indicate it cannot receive any more microinstructions 226, then the instruction translator 294 flushes any in-flight access to the uncore ROM 108. Once the RAT 206 deasserts the stall signal, the microsequencer 236 begins fetching microcode instructions again at the address of the last microinstruction 226 sent to the RAT 206. In an alternate embodiment, the instruction translator 294 saves the state of the in-flight accesses to the uncore ROM 108 so that it may avoid re-fetching the microinstructions associated with the in-flight accesses.

The access latency of the uncore ROM 108 is greater than each of the core ROMs 104. In one embodiment, the core ROM 104 has a 3-cycle access latency and the access latency for the uncore ROM 108 is variable in embodiments in which its read port(s) are shared by the plurality of cores 102.

Referring now to FIG. 3, a block diagram illustrating an example of the microcode address space of each core 102 of FIG. 1 according to one embodiment is shown. In the example of FIG. 3, the core ROM 104 provides 16 Kwords of storage space to its corresponding core 102 that occupy addresses 0x0000 to 0x3FFF, and the uncore ROM 108 provides 16 Kwords of storage space to each of the cores 102 that occupy addresses 0x4000 to 0x7FFF. In the embodiment of FIG. 3, the upper micro-fetch address 254 bit is used to determine whether the microcode instruction is to be fetched from the core ROM 104 (upper bit is a 0) or the uncore ROM 108 (upper bit is a 1). In other embodiments, additional bits of the micro-fetch address 254 must be examined, for example, in embodiments in which the address range of the core ROM 104 is not equal to the address range of the uncore ROM 108. The address space addressed by the microcode fetch address 254 is a non-architectural address space distinct from the architectural address space addressed by the architectural program counter 218. In this sense, the uncore ROM 108 and core ROMs 104 are non-architecturally-visible memories.

Figure 4:
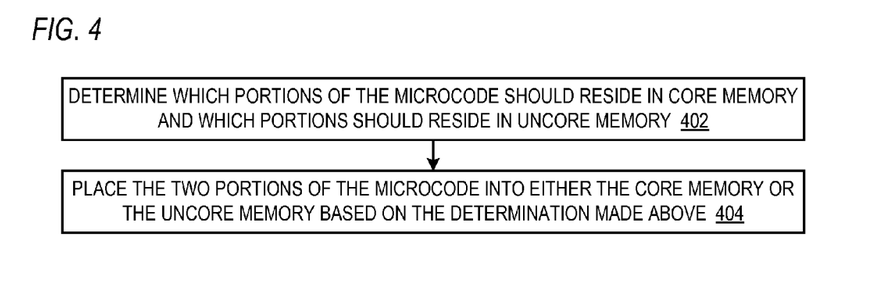
FIG. 4 is a flowchart illustrating a process for placing microcode instructions into the core ROM and uncore ROM of FIG. 1.

Referring now to FIG. 4, a flowchart illustrating a process for placing microcode instructions into the core ROM 104 and uncore ROM 108 is shown. Flow begins at block 402.

At block 402, a determination is made regarding which portions of the microcode should reside in the core ROM 104 and which portions should reside in the uncore ROM 108. Preferably, microcode routines that require higher performance should reside in the core ROM 104 because it has a shorter access latency than the uncore ROM 108. Another consideration may be contention among the cores 102 for the uncore ROM 108. For example, generally speaking, less frequently invoked microcode routines can tolerate the longer access time of the uncore ROM 108. This generally fits well with the fact that statistically the less frequently invoked microcode routines will mean a lower probability that two or more cores 102 will be accessing the uncore ROM 108 at the same time. Preferably, the programmer makes the decision at block 402; however, embodiments are contemplated in which the decision is automated, such as by profiling software. Flow proceeds to block 404.

At block 404, the portion of the microcode destined for the core ROM 104 according to the determination at block 402 is placed into the core ROM 104, and the portion of the microcode destined for the uncore ROM 108 according to the determination at block 402 is placed into the uncore ROM 108. In one embodiment, a microcode assembler supports directives that may be placed in the microcode assembly code that indicates whether the lines of code after a particular directive should be placed in the core ROM 104 or the uncore ROM 108. Preferably, the assembler maintains two locations counters, one for the core ROM 104 and one for the uncore ROM 108. Flow ends at block 404.

Figure 5:
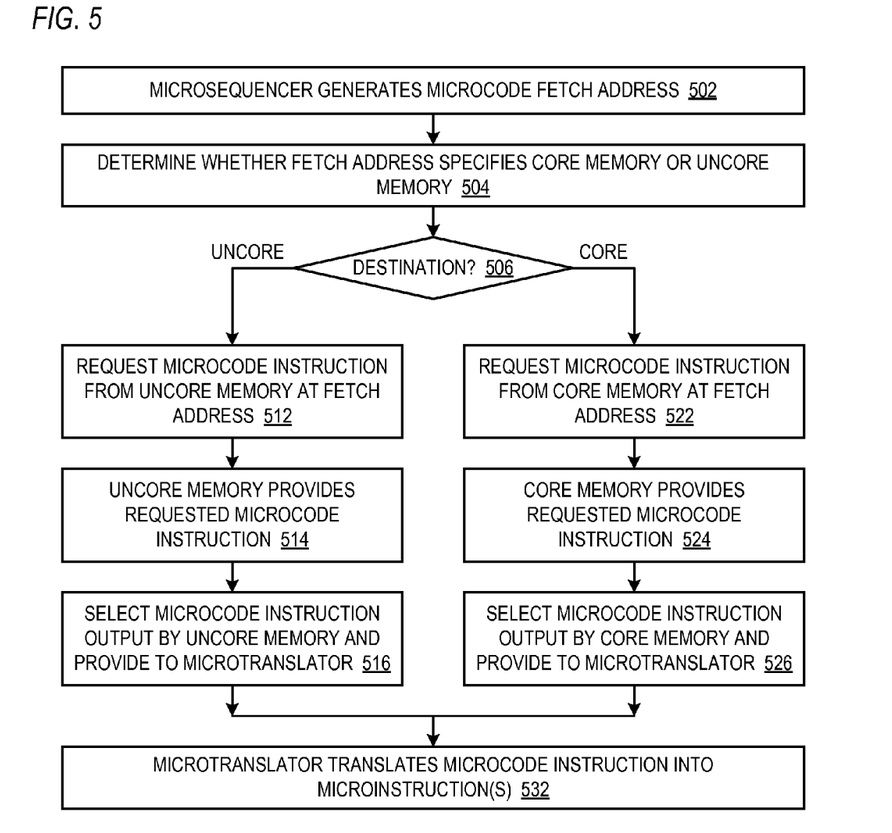
FIG. 5 is a flowchart illustrating operation of the microprocessor of FIGS. 1 and 2.

Referring now to FIG. 5, a flowchart illustrating operation of the microprocessor 100 of FIGS. 1 and 2 is shown. Flow begins at block 502.

At block 502, the microsequencer 236 generates a microcode fetch address 254. The microsequencer 236 may do so in response to the simple instruction translator 204 trapping to it to fetch the first microcode instruction of a microcode routine specified by the trap address 252, or the microsequencer 236 may do so in course of fetching subsequent microcode instructions of the routine, namely sequential instructions or target instructions of a control instruction. Flow proceeds to block 504.

At block 504, a determination is made regarding whether the microcode fetch address 254 specifies an address for the uncore ROM 108 or the core ROM 104 associated with the particular core 102 generating the microcode fetch address 254. In one embodiment, the microsequencer 236 makes the determination. Flow proceeds to decision block 506.

At decision block 506, if it was determined at block 504 that the microcode fetch address 254 specifies an address for the uncore ROM 108, flow proceeds to block 512; otherwise, the microcode fetch address 254 specifies an address for the core ROM 104 and flow proceeds to block 522.

At block 512, a request is made to the arbitration logic 106 to access the uncore ROM 108 at the relevant portion of the microcode fetch address 254. For example, in the embodiment of FIG. 3, the microcode fetch address 254 less the upper bit is provided on the address portion of the bus 112 to the arbitration logic 106, which is forwarded to the uncore ROM 108 once the arbitration logic 106 has selected the requesting core 102 to be allowed to access the uncore ROM 108. Flow proceeds to block 514.

At block 514, the uncore ROM 108 provides the requested microcode instruction 249 in response to the request made at block 512. As described above, in one embodiment the bus 112 includes a valid indicator to indicate to the requesting core 102 when a valid microcode instruction 249 is being provided on the bus 112. Flow proceeds to block 516.

At block 516, the microsequencer 236 causes the mux 222 to select the microcode instruction 249 provided by the uncore ROM 108 for provision as microinstruction 247 to the microtranslator 237. As described above, in one embodiment the uncore ROM 108 provides the microcode instruction 249 multiple clock cycles after the microsequencer 236 provides the microcode fetch address 254, and which the number of clock cycles may be variable. Consequently, the microsequencer 236 is configured to control the mux 222 to select the microcode instruction 249 provided by the uncore ROM 108 in response to the valid indicator received on the bus 112 from the arbitration logic 106. Flow proceeds to block 532.

At block 522, a request is made to the core ROM 104 at the relevant portion of the microcode fetch address 254. For example, in the embodiment of FIG. 3, the microcode fetch address 254 less the upper bit is provided to the core ROM 104. Flow proceeds to block 524.

At block 524, the core ROM 104 provides the requested microcode instruction 251 in response to the request made at block 522. In one embodiment, the core ROM 104 is always accessed and always outputs a microinstruction 251 in response to the microcode fetch address 254. In another embodiment that may reduce power consumption, the core ROM 104 is only accessed and outputs a microinstruction 251 if the microsequencer 236 indicates the request is destined for the core ROM 104. Flow proceeds to block 526.

At block 526, the microsequencer 236 causes the mux 222 to select the microcode instruction 249 provided by the uncore ROM 108 for provision as microinstruction 247 to the microtranslator 237. In one embodiment, the microsequencer 236 generates the requests to the uncore ROM 108 at block 512 and to the core ROM 104 at block 522 in an interleaved and pipelined fashion, and the microsequencer 236 maintains state information that specifies the order in which the requested microcode instructions are to be provided. In one embodiment, the microsequencer 236 maintains a bit array in which each bit has a first binary value if the uncore ROM 108 is to provide the microcode instruction 249 and has the second binary value if the core ROM 104 is to provide the microcode instruction 251. The bits of the bit array are in the order in which requests are to be satisfied according to the microcode routine sequence. Flow proceeds to block 532.

At block 532, the microtranslator 237 translates the selected microcode instruction 247 into one or more microinstructions 246 for provision to the RAT 206 via mux 292, as described above. Flow ends at block 532.

Figure 6:
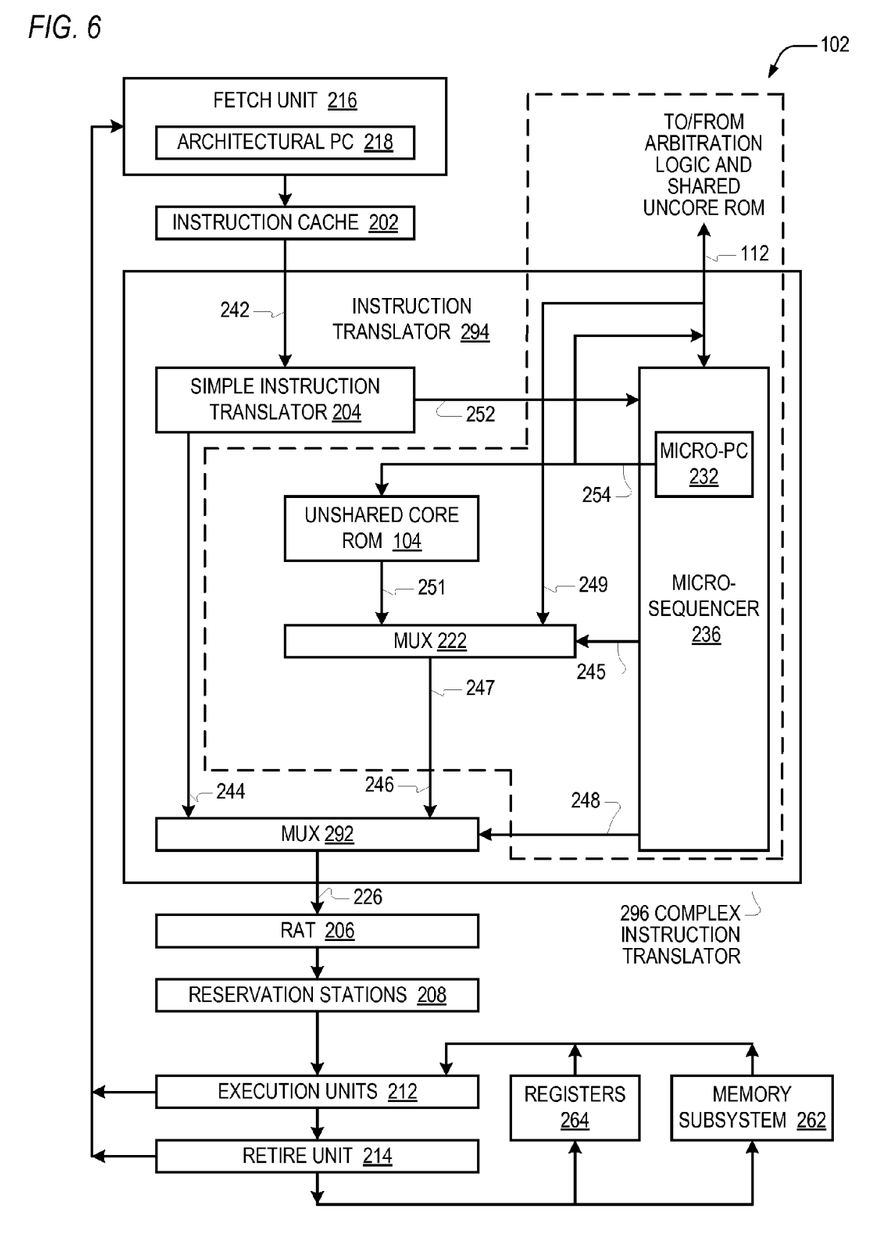
FIG. 6 is a block diagram illustrating an alternate embodiment of a processing core of FIG. 1.

Referring now to FIG. 6, a block diagram illustrating a processing core 102 of FIG. 1 according to an alternate embodiment is shown. The core 102 of FIG. 6 is similar in many respects to the core 102 of FIG. 2, and like-numbered elements are the same. However, the embodiment of FIG. 6 does not include the microtranslator 237 or IISR 235 of FIG. 2. Instead, the microcode instructions 249/251 provided by the uncore ROM 108/core ROM 104 are microinstructions 247/246 that may be provided to the execution units 212 for execution without further translation.

It should be understood from the foregoing that the core ROM 104 and uncore ROM 108 do not function like a cache memory hierarchy in which data associated with an address may reside in multiple cache memories at different levels in the cache hierarchy. That is, for a given fetch address in the non-architectural microcode address space, the microcode instruction word at the fetch address resides in only one place, not in multiple places. More specifically, the microcode instruction word for a given fetch address resides either in the core ROM 104 or in the uncore ROM 108, but no both. Furthermore, it should be understood from the foregoing that an ordered pair consisting of (core number, microcode fetch address) determine which of the various microcode memories is the unique source of the given microcode instruction word to be fetched. More specifically, if the fetch address indicates the uncore ROM 108, then the uncore ROM 108 is the source; whereas, if the fetch address indicates the uncore ROM 108 is not the source, then the core ROM 104 corresponding to the core 102 that generated the fetch address is the source.

Although embodiments have been described in which the memories that store the microcode are read-only memories, embodiments are contemplated in which the microcode memories are also writeable. For example, the uncore ROM 108 and/or core ROM 104 may comprise a FLASH memory from which the microcode unit fetches microcode instructions. Furthermore, the microcode may be patchable via patch hardware that includes one or more writeable memories.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
a plurality of processing cores, wherein each core of the plurality of processing cores comprises a corresponding memory physically located inside the core and readable by the core but not readable by the other of the plurality of processing cores (hereinafter "core memory");
a memory physically located outside all of the plurality of processing cores and readable by all of the plurality of processing cores (hereinafter "uncore memory");
wherein, for each core of the cores, the uncore memory and corresponding core memory collectively provide M words of storage for microcode instructions fetchable by the core as follows:
the uncore memory provides J of the M words of microcode instruction storage; and
the corresponding core memory provides K of the M words of microcode instruction storage, wherein J, K and M are positive integers, wherein M=J+K.

2. The microprocessor of claim 1, wherein the microprocessor comprises a single integrated circuit.

3. The microprocessor of claim 2, wherein the plurality of processing cores is Q, wherein Q is an integer greater than or equal to two, wherein a total physical area occupied by the uncore memory and the Q core memories on the integrated circuit is less than a total physical area that would be occupied on the integrated circuit by Q memories each configured to provide M words of storage for microcode instructions.

4. The microprocessor of claim 1, wherein the uncore memory and plurality of core memories are read-only memories.

5. The microprocessor of claim 1, wherein the plurality of core memories and the uncore memory are non-architecturally-visible memory.

6. The microprocessor of claim 1, wherein for each of the plurality of cores, less time is required to fetch microcode instructions from its corresponding core memory than from the uncore memory.

7. The microprocessor of claim 1, wherein the microcode instructions are non-architectural instructions that implement architectural instructions of the microprocessor.

8. A method for providing microcode instruction storage space for a plurality of processing cores of a microprocessor, the method comprising:
   for each core of the cores, providing M words of memory storage for microcode instructions fetchable by the core;
   wherein said providing the M words of memory storage comprises:
      for each core of the cores, providing J of the M words of microcode instruction storage from a memory physically located outside all of the plurality of processing cores and readable by all of the plurality of processing cores (hereinafter "uncore memory"); and
      for each core of the cores, providing K of the M words of microcode instruction storage from a corresponding memory physically located inside the core and readable only by the core (hereinafter "core memory"), wherein J, K and M are positive integers, wherein M=J+K.

9. The method of claim 8, wherein the uncore memory and plurality of core memories are read-only memories.

10. The method of claim 8, wherein the plurality of core memories and the uncore memory are non-architecturally-visible memory.

11. The method of claim 8, wherein the microcode instructions are non-architectural instructions that implement architectural instructions of the microprocessor.

12. An integrated circuit, comprising:
   a plurality of processing cores, wherein each core of the plurality of cores comprises its own unshared memory physically located inside the core and configured to store a first portion of microcode instructions; and
   a shared memory, physically located outside the plurality of processing cores and configured to store a second portion of microcode instructions;
   wherein each of the processing cores is configured to fetch both the first portion of microcode instructions from its own unshared memory and the second portion of microcode instructions from the shared memory.

13. The integrated circuit of claim 12, wherein the microcode instructions stored in the shared memory and the plurality of unshared memories are non-architectural instructions that implement one or more architectural instructions of the microprocessor.

14. The integrated circuit of claim 12, wherein each core of the plurality of cores comprises:
   a non-architectural program counter that holds a fetch address at which a next microcode instruction is fetched; and
   control logic, configured to examine a value of the fetch address, and to generate a request to fetch the next microcode instruction either from the core's own unshared memory or from the shared memory based on the fetch address value.

15. The integrated circuit of claim 14, wherein the control logic is configured to generate the request for the next microcode instruction from the core's own unshared memory when the fetch address is within a first address range and to generate the request for the next microcode instruction from the shared memory when the fetch address is within a second address range, wherein the first and second address ranges are within a single non-architectural address space.

16. The integrated circuit of claim 15, wherein the first and second address ranges are contiguous within the single non-architectural address space.

17. The integrated circuit of claim 14, wherein the microcode instruction at a given fetch address resides either in the core's own unshared memory or in the shared memory, but not both.

18. The integrated circuit of claim 12, further comprising:
   an arbitration circuit, configured to arbitrate between requests from the plurality of cores for the microcode instructions from the shared memory.

19. A computer program product encoded in at least one non-transitory computer usable medium for use with a computing device, the computer program product comprising:
   computer usable program code embodied in said medium, for specifying a microprocessor, the computer usable program code comprising:
      first program code for specifying a plurality of processing cores, wherein each core of the plurality of processing cores comprises a corresponding memory physically located inside the core and readable by the core but not readable by the other of the plurality of processing cores (hereinafter "core memory"); and
      second program code for specifying a memory physically located outside all of the plurality of processing cores and readable by all of the plurality of processing cores (hereinafter "uncore memory");
   wherein, for each core of the cores, the uncore memory and corresponding core memory collectively provide M words of storage for microcode instructions fetchable by the core as follows:
      the uncore memory provides J of the M words of microcode instruction storage; and
      the corresponding core memory provides K of the M words of microcode instruction storage, wherein J, K and M are positive integers, wherein M=J+K.

20. The computer program product of claim 19, wherein the at least one non-transitory computer usable medium is selected from the set of a disk, tape, or other magnetic, optical, or electronic storage medium and a network or wire line communications medium.

* * * * *